United States Patent
Hu et al.

(10) Patent No.: US 9,152,731 B2
(45) Date of Patent: Oct. 6, 2015

(54) DETECTING A BROKEN POINT IN A WEB APPLICATION AUTOMATIC TEST CASE

(71) Applicant: INTERNATIONAL BUSINESS MACHINES CORPORATION, Armonk, NY (US)

(72) Inventors: Chang Chun Hu, Shanghai (CN); Xi Xi Liu, Shanghai (CN); Jia Ye Wang, Shanghai (CN); Deng Peng Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/718,098

(22) Filed: Dec. 18, 2012

(65) Prior Publication Data

US 2013/0159975 A1    Jun. 20, 2013

(30) Foreign Application Priority Data

Dec. 19, 2011    (CN) .......................... 2011 1 0427398

(51) Int. Cl.
G06F 9/44    (2006.01)
G06F 17/30    (2006.01)
G06F 11/36    (2006.01)

(52) U.S. Cl.
CPC ........ *G06F 17/30893* (2013.01); *G06F 11/368* (2013.01)

(58) Field of Classification Search
USPC .......... 717/124, 125, 126, 131; 715/234, 704; 718/102; 714/38, 32; 707/999.107; 709/203; 726/6
See application file for complete search history.

(56) References Cited

U.S. PATENT DOCUMENTS

| | | | |
|---|---|---|---|
| 6,298,317 B1 | 10/2001 | Wiemann | |
| 6,415,396 B1 | 7/2002 | Singh et al. | |
| 7,210,066 B2 | 4/2007 | Mandava et al. | |
| 8,001,532 B1 * | 8/2011 | Jakubiak et al. | 717/125 |

(Continued)

FOREIGN PATENT DOCUMENTS

| | | |
|---|---|---|
| CN | 101118515 A | 2/2008 |
| CN | 101882107 A | 11/2010 |

OTHER PUBLICATIONS

Memon et al., Automatic Regression Testing for Evolving GUI Software, Journal of Software Maintenance and Evolution: Research and Practice, vol. 17, Issue 1, pp. 27-64, Jan./Feb. 2005, College Park, MD., USA.

(Continued)

*Primary Examiner* — Tuan Vu
(74) *Attorney, Agent, or Firm* — Cantor Colburn LLP; Rahan Uddin

(57) ABSTRACT

Testing a broken point in a web application automatic test case is performed by a system that includes a recording module configured to, when the test case runs, for a step in the test case, record a web page output corresponding to the step, and information of an element manipulated by the step. The web page output has an annotation for identifying the web page output. The system also includes a rendering engine module configured to, after the web application has been updated, for the recorded step, render a web page output of the updated web page with the same annotation. The system also includes a detecting module configured to detect whether the rendered web page output of the updated web page contains the element manipulated by the recorded step, and determine the step as a broken point when the rendered web page output does not contain the element.

19 Claims, 11 Drawing Sheets

(56) References Cited

U.S. PATENT DOCUMENTS

| | | | |
|---|---|---|---|
| 2005/0193269 A1* | 9/2005 | Haswell et al. | 714/38 |
| 2006/0107121 A1 | 5/2006 | Mendrala et al. | |
| 2006/0150026 A1 | 7/2006 | Kolawa et al. | |
| 2006/0206856 A1* | 9/2006 | Breeden et al. | 717/101 |
| 2007/0016894 A1* | 1/2007 | Sreedhar | 717/131 |
| 2008/0092119 A1* | 4/2008 | Sweis | 717/124 |
| 2008/0120598 A1 | 5/2008 | Imeshev | |
| 2009/0044192 A1* | 2/2009 | Gupta et al. | 718/102 |
| 2009/0133000 A1* | 5/2009 | Sweis et al. | 717/124 |
| 2009/0187788 A1 | 7/2009 | Dhuvur et al. | |
| 2010/0100808 A1* | 4/2010 | Hawkins | 715/234 |
| 2010/0251217 A1* | 9/2010 | Miller | 717/126 |
| 2011/0055683 A1* | 3/2011 | Jiang | 715/234 |
| 2011/0161936 A1 | 6/2011 | Huang et al. | |

OTHER PUBLICATIONS

Fraternali et al., Higher Order Generative Framework for Weaving Traceability Links Into a Code Generator for Web Application Testing, pp. 340-354. Proceeding ICWE '9 Proceedings for the 9th International Conference on Web Engineering, Spain, Jun. 24-26, 2009 Proceedings.

* cited by examiner

```
<!DOCTYPE HTML PUBLIC "-//W3C//DTD HTML 4.01//EN" "http://www.w3.org/TR/html4/strict.dtd">
<html>
<!-- start frame.jsp -->
    <head>
        <title>Sample output of a JSP file</title>
    </head>
    <body id="htmlbody" style="font-size: 8.0pt;">
        <!-- start root_container.jsp -->
        <div id="root_container">
            <div id="container-content" fitheight="auto">
                <!-- start left_nav.jsp -->
                <div id="left-nav" style="float:left; height:100%; width:16cm;">
                    <div></div>
                <!-- end left_nav.jsp -->
                <!-- start main.jsp -->
                <div id="content" fitwidth="auto" style="float:left;height:100%;padding-left:5px;">
                    <div></div>
                <!-- end main.jsp -->
            </div>
        <!-- end root_container.jsp -->
        <script type="text/javaScript"></script>
    </body>
<!-- end frame.jsp -->
</html>
```

Fig. 3

```
<body>
<!-- start jsp1 -->
<button id='btn1' >Click</button>
<!-- end jsp1 -->
</body>
```

Fig. 4

```
<body>
<%
String role =xxxBean.getRole();
%>
<%
if(role.equals("role1" )){
%>
<button id ='btn1'><%= xxxBean.getValueA()%>
</button>
<%
} else {
%>
<input id= 'txt1' type = 'text'  value=
<%=xxxBean.getTextValue()%>> </input>
<%
}
%>
</body>
``` web page output 1 (role == 'role1')

```
<body>
<button id= "btn1" value="sp1">Test</button>
</body>
``` web page output 2 (role != 'role1')

```
<body>
<input id= 'txt1' type='text' value="sp2" > </input>
</body>
```

Fig. 5

| Test case | Step | Test script code | Element information | Broken level | Suggestion |
|---|---|---|---|---|---|
| 1 | 1 | clickAt("//input[@id='signInBtn']", ""); | tag="input" id="signInBtn" name="signInBtn" xpath="//form[@id='login_form']/p[1]/input[0]" key="id" | Error | The id of an element with the same name is "signBtn" |
| 3 | 2 | clickAt("//button[@id='btnStart']", ""); | tag="button" id="btnStart" xpath="//div[@id="content"]/p[0]/Button" key="id" | Warning | The element is now the input box "btnStart" |
| 3 | 4 | clcikAt("link=Notices") | tag="a" linkText="Notices" key="linkText" | Error | NA |

Fig. 8

DETECTING A BROKEN POINT IN A WEB APPLICATION AUTOMATIC TEST CASE

PRIORITY

The present application claims priority to Chinese Patent Application No. 201110427398.3, filed Dec. 19, 2011, and all the benefits accruing therefrom under 35 U.S.C. §119, the contents of which in its entirety are herein incorporated by reference.

BACKGROUND

The present invention relates to web application testing and, more particularly, to detecting a broken point in a web application automatic test case.

For many web applications, automatic test scripts can be built to cover basic user scenarios. Whenever a developer modifies some code, e.g., when a new version of a product is launched, the scripts or their subsets need to be re-run to ensure that the functions of the product are still correct. However, in many circumstances, due to changes to user interfaces (UIs) of the web application, the test scripts themselves are no longer valid. That is to say, these automatic test scripts need to be updated according to the UI changes made by developers. Currently, UI changes made by the developers are not synchronized to the automatic test scripts, and thus, the testers need to repeatedly run the automatic test scripts, so as to find broken points without any hints, and then manually fix them. For a large project, determining all of the broken points in an automatic test case, as well as fixing them, can be inefficient and yield inaccurate results.

SUMMARY

According to one embodiment, there is provided a system for detecting a broken point in a web application automatic test case, comprising: a recording module configured to, when an automatic test case runs, for at least one step in the automatic test case, record a web page output corresponding to the step, and information of an element manipulated by this step in the webpage output, wherein the web page output has an annotation for identifying the web page output; a rendering engine module configured to, after the web application has been updated, for the recorded at least one step of the test case, render the web page output of the updated webpage with the same annotation as appearing in the web page output corresponding to the step; a detecting module, configured to detect whether the rendered web page output of the updated web page contains the recorded element manipulated by the step, and to determine the step as a broken point when the detection result is no.

According to another embodiment, there is provided a method for detecting a broken point in a web application automatic test case, comprising: when an automatic test case runs, for at least one step in the automatic test case, recording a web page output corresponding to the step, and information of an element manipulated by this step in the web page output, wherein the web page output has an annotation for identifying the web page output; after the web application has been updated, for the recorded at least one step of the test case, rendering the web page output of the updated webpage with the same annotation as appearing in the web page output corresponding to the step; detecting whether the rendered web page output of the updated web page contains the element manipulated by the step, and determining the step as a broken point when the detection result is no.

BRIEF DESCRIPTION OF THE SEVERAL VIEWS OF THE DRAWINGS

The appended claims set forth novel features which are considered as characteristic of the embodiments of the present invention. However, the embodiments will be best understood by referring to the following detailed description when read in conjunction with the accompanying drawings, in which:

FIG. 3 shows an example of adding annotations to a web page consisting of a plurality of sub-web pages in accordance with an embodiment;

FIG. 4 shows a web page output copy corresponding to a step in a test case recorded by a recording module in accordance with an embodiment;

FIG. 5 illustrates source code of an exemplary page and different page outputs as its different conditional branches in accordance with an embodiment;

FIG. 8 shows an example of a report on broken points generated by the detecting module;

DETAILED DESCRIPTION

The following embodiments of the present invention will be described with reference to the accompanying drawings. In the following description, numerous specific details are set forth so that the embodiments can be understood more thoroughly. However, it will be apparent to those skilled in the art that the realization of the embodiments described herein may be without some of the specific details. The following aspects, features, embodiments, and advantages are provided herein for illustration, rather than being construed as elements or limitations of the attached claims, unless explicitly stated otherwise.

Figure 1:
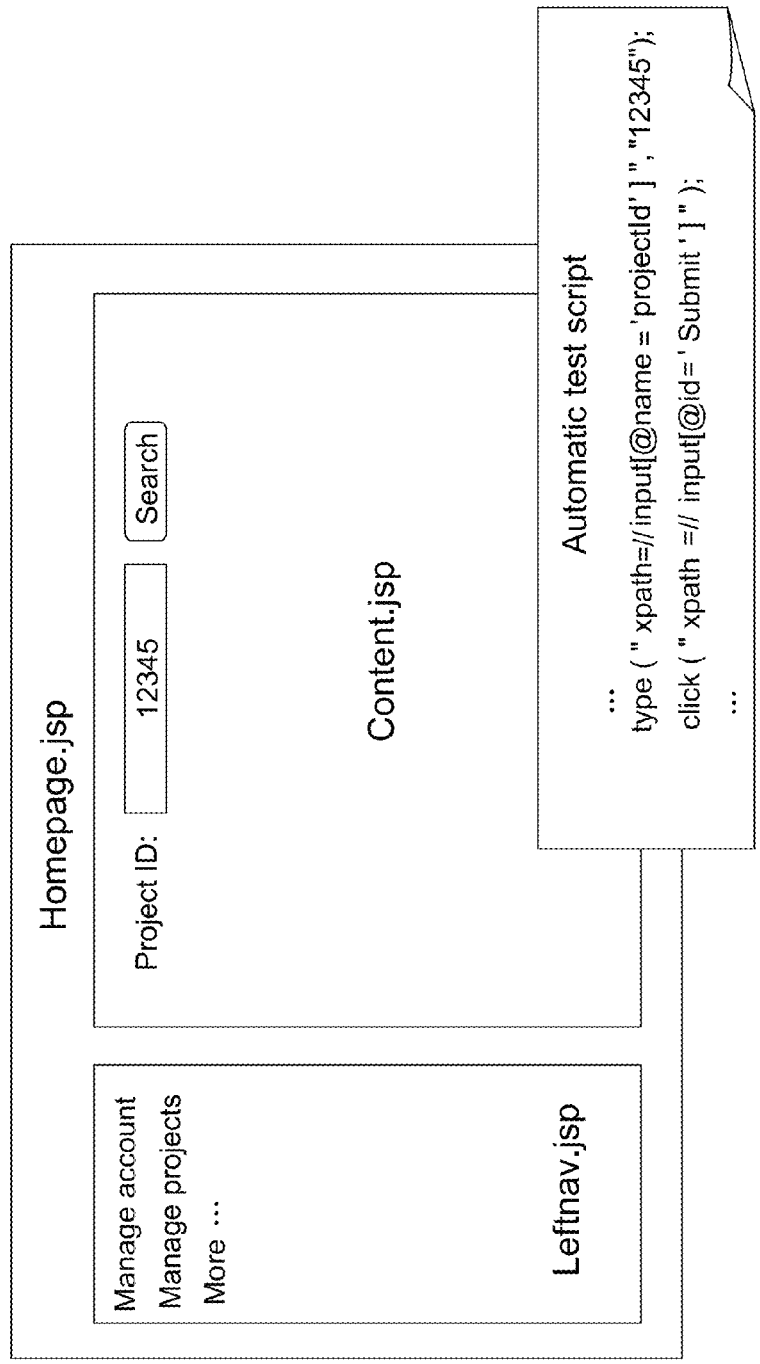
FIG. 1 shows an example of an automatic test script scenario in accordance with an embodiment.

FIG. 1 shows an example of an automatic test script scenario in which the embodiments of the present invention can be applied. As shown, web page output to be tested by an automatic test script consists of a Java Server Pages™ (JSP) page Homepage.jsp, and Homepage.jsp contains Leftnav.jsp and Content.jsp. Content.jsp contains the following graphical user interface (GUI) elements: a text input box with a label of ProjectID and a name of projectID, and a button with a label of Search and an id of submit. The automatic test script for testing the JSP page contains testing statements, type ("xpath=//input[@name='projectId']", "12345") and click ("xpath=//input[@id='submit']"), for testing the text input box and the button, respectively. Each test statement in the automatic test script is for executing one operation on an element in the web page output, which can be referred to as a step in the automatic test script, and each step may have a unique number in the automatic test script.

Figure 2:
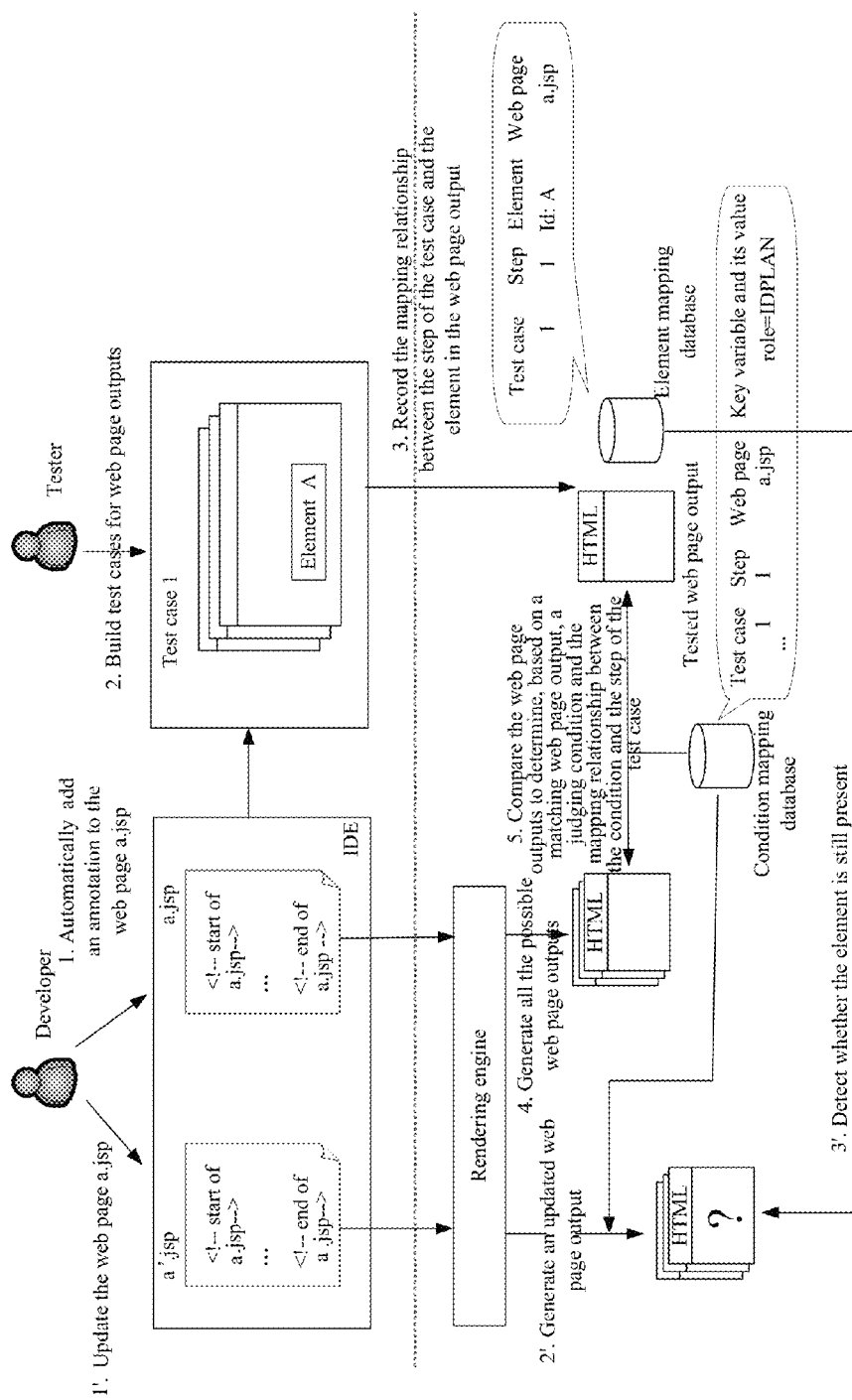
FIG. 2 shows a schematic diagram of an overall operation process of a system for detecting a broken point in a web application automatic test case according to an embodiment.

FIG. 2 shows a schematic diagram of an overall operation process of a system for detecting a broken point in a web application automatic test case according to an embodiment of the present invention.

In step 1, which is directed to the development phase of a web application, e.g., in an Integrated Development Environment (IDE), an annotating module in the system automatically adds an annotation at the beginning and end of each web page (e.g., HTML page or JSP page) for identifying the web page (e.g., if there is the <html> element in the page, the annotation will be after the beginning <html> and before the ending </html>). The annotation is, for example, an HTML annotation. The annotating module may generate and add the annotation based on the name of the web page (which is usually designated by the user when creating the web page) or another identifier of the web page. The annotating module may, for example, automatically add the annotation for identifying the web page at the beginning and end of the document each time when the developer saves the web page document in the IDE. Since such an identifier appears in the form of an HTML annotation, when the developer opens the document in IDE, the annotation is invisible.

For a web page consisting of a plurality of sub-web pages (for example, a JSP file, etc.), an annotation may be added at the beginning and end of each sub-web page for identifying the sub-web page.

FIG. 3 shows an example of adding annotations to a web page that consists of a plurality of sub-web pages. As shown, the web page consists of a jsp page with an identifier of frame.jsp, and this jsp page contains a jsp page with an identifier of root_containerjsp, while root_containerjsp page contains a jsp page with an identifier of left_navjsp and a jsp page with an identifier of main.jsp. The annotating module in the system automatically adds at the beginning and end of each jsp page an annotation including its identifier. For example, <!-start frame.jsp--> and <!-end frame.jsp> are a pair of annotations added, which identify the jsp page frame.jps, and are added at the beginning and end of the page.

It is understood that the annotation may also be added to the web page at other times, e.g., after the development phase of the web application is finished.

In step 2, during the test phase of the web application, the tester builds a set of test cases for web pages, and each test case may be for testing elements in one web page output, e.g., a test case is for testing by manipulating an element A (and other elements) in a web page output.

In step 3, when the tester performs testing by running the test case against the web application, at each step of the test case, a recording module in the system records the mapping relationship (which may be referred to as an element mapping relationship) between the step of the test case and the element in the web page output it manipulates. The element mapping relationship may be, for example, stored in an element mapping database. In the element mapping database, the primary key may be an identifier of the test case and the number of a step in the test case, and in each row may be stored an identifier of the web page output manipulated by the step in the test case (e.g., the above annotation of the web page; since the web page output is generated by the web page, the identifiers of the two are identical) and an identifier of the element therein. For example, in a row of the element mapping database are recorded an identifier of a test case as "1," the number of a step as "1," an identifier of an element as "A," and an identifier of a web page output as "a.jsp." This indicates that step 1 of test case 1 manipulates element A in the web page output a.jsp. In an embodiment, a type, name, and other attributes of an element manipulated by a step of a test case may be recorded in the element mapping database.

In another embodiment, in step 1', developers may update the web application by, for example, modifying elements in a web page. The identifier of the modified web page should remain unchanged, indicating that the modified web page is an updated page of the original web page with the same identifier.

In step 2', after the developers have updated the web application, a rendering engine module in the system renders the modified web page. The rendering engine module may, for each step of each test case in the element mapping relationship recorded in the above step 3, render the modified web page with the same annotation as appearing in the web page corresponding to the step, so as to generate a modified web page output (e.g., the result of rendering a web page may be referred to as a web page output).

When the web page contains dynamic contents such as JSP, the rendering includes executing the code of the dynamic contents such as JSP in the web page, so as to generate HTML code. When the web page does not contain dynamic contents, the rendering may include obtaining, from the development environment or application server and/or combining, the code of the web page.

In step 3', a detecting module in the system may detect the modified web page output generated in the above step 2', to determine whether the modified web page output still contains the element corresponding to the step recorded in the element mapping relationship. If the result of the determination is no, the detecting module may determine that the step is a broken point, and report the information about the broken point to the user, so that the user can fix it. The user may fix the broken point by replacing the element manipulated by the step in the test case with another element present in the modified web page, deleting the step, etc.

The above operation process is suitable for when the web page is a static page (or a dynamic page not containing conditional statements or loop statements). However, a web page usually includes dynamic contents such as JSP, which refer to programming code such as JSP code contained in or introduced into the web page. The code is executed during the rendering process of the web page, so as to generate corresponding HTML code, and the programming code usually contains various programming statements such as loop statements, conditional statement, etc. For a web page containing a conditional statement expressed in JSP code, etc., during the rendering process of the web page, depending on different values of one or more key variable involved in the conditional statement (in the embodiments described herein, a key variable refers to a variable contained in the condition of a conditional statement), different web page outputs belonging to different conditional branches are obtained. For a web page containing a conditional statement, a comparison module or recording module in the system will, besides recording the web page output corresponding to the step of the test case as described above, further record the conditional branch in the original web page to which the web page output corresponding to the step belongs, i.e., the value of the key variable. Only in this way, when the web page has been modified, based on the recorded conditional branch to which the web page output corresponding to the step of the tested case belongs, can the modified web page output in the same conditional branch of the modified web page be generated, and it be determined whether the modified web page output still contains the element manipulated by the step.

In view of this, according to an embodiment of the present invention, first at the above step 3, the recording module in the system may further need to record copies of the web page outputs corresponding to the steps of the test case.

FIG. 4 shows a copy of a web page output corresponding to a step in the test case recorded by the recording module in the system. As shown, the copy of the web page output includes a button with an id of "btn1." For example, step 1 in the automatic test case "testcase1" is a click operation on the button, so the recording module will record the mapping between step 1 of testcase1 and element btn1 of the web page output in the element mapping database, and will record the web page output copy corresponding to step 1 of testcase1.

Referring back to FIG. 2, after the above step 3, the operation process of the system will now be described.

In step 4 of FIG. 2, for each step of the test case recorded in step 3, the rendering engine module in the system may, for the web page with the identifier of the web page output corresponding to the step, determine whether the web page contains a conditional statement, and in response to the determination of yes, by assigning different values to the key variable of the conditional statement in the web page, generate all the possible web page outputs of the web page. The rendering engine module may further store the identifier of the web page, the conditional statement, the key variable, the different values of the key variable, the respective web page outputs corresponding to the different values of the key variable, for example, in a relational table, to be used for the coverage determination described below.

FIG. 5 shows source code of an exemplary JSP page and its different page outputs generated by different conditional branches. As shown, the JSP page contains an if . . . else conditional statement, and based on whether the value of the key variable role in the condition of the conditional statement equals "role1" or not, are generated different page outputs having a button with an id of "btn1" and a text input box with an id of "txt1", as shown at the right side of the Figure. For the JSP page, the rendering engine module in the system may generate two possible page outputs of the JSP page by assigning the value of the key variable role to be equal to role 1 and not equal role1.

In step 5 of FIG. 2, a comparing module in the system may compare each one of all the rendered possible web page outputs with the copy of the web page output recorded at step 3, to determine with which one of all the rendered possible web page outputs the recorded web page output copy is consistent. Such comparison is accomplished by, for example, first generating a DOM tree of the recorded web page output copy and a DOM tree of each of the generated web page outputs, and then comparing the DOM trees.

In addition, for a web page containing a loop statement, since during the rendering process the execution results of the loop statement are usually a variable number of information items (e.g., items of a pull-down menu), even if the recorded web page output copy and the generated one web page output are generated from the same conditional branch of the same one web page, the two may still contain different numbers of information items. For this reason, the system may identify a loop statement in the dynamic contents of the web page during the rendering process, and add special marks on the information items generated from the loop statement in the web page output, to indicate that the information items are generated from a loop statement. Thus, when the rendered web page output is compared with the recorded web page output copy, the information items with the special marks contained in the rendered web page output and the corresponding information items in the recorded web page output copy may be ignored.

After the above comparison has been performed, the mapping relationship (which may be referred to as key variables/ branches mapping relationship) between the key variable and its value corresponding to one rendered web page output consistent with the recorded web page output copy and the step of the test case may be recorded, for example, in a condition mapping database. For example, in a row of the condition mapping database is recorded test case 1, step 1, web page output a.jsp, condition role=IDPLAN, and this indicates that step 1 in test case 1 tests the web page output of web page a.jsp when the conditional variable role is IDPLAN.

The condition mapping database may also be merged with the element mapping database described above as a same mapping database, so that in this mapping database, the name or identifier of a test case and the number of a step will be used as the primary key to record an identifier of a web page output corresponding to each step of each test case, an identifier and other attributes of an manipulated element in the web page, a corresponding key variable and value thereof, etc.

Since the condition mapping database or the mapping database may contain the web page output corresponding to each step in all the test cases for a web application, the identifier of the manipulated web page element and the corresponding key variable and value thereof, it can conveniently provide information on test coverage of the test cases. For example, a coverage determining module in the system may, by querying a key variable and its values corresponding to steps in the test cases in the condition mapping database, and comparing them with the different values of the key variable obtained for the web page with the same identifier as the web page outputs corresponding to the recorded steps of the test cases by the rendering engine module in above step 4 and for generating all the possible web page outputs of the web page, determine whether the values of the key variable corresponding to steps of the test cases in the condition mapping database cover all the different values of the key variable for generating all the possible web page outputs of the web page, so as to determine the coverage of the test case.

Figure 6:
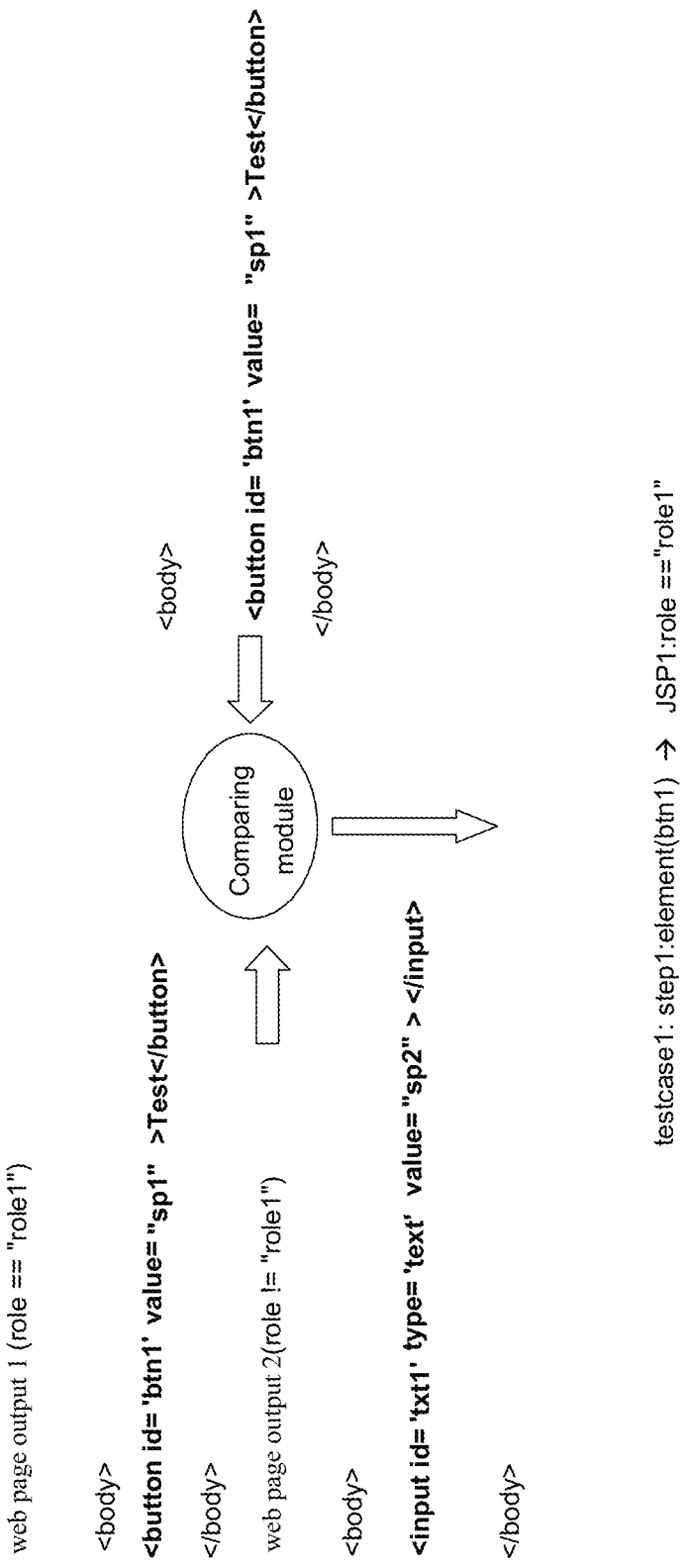
FIG. 6 shows a process of comparing, determining and recording performed for the web page outputs shown in FIG. 5 and the web page output copy shown in FIG. 4 by a comparing module in accordance with an embodiment.

FIG. 6 shows the processes of comparing, determining and recording performed by the comparing module in the system for the different web page outputs shown in FIG. 5 generated in step 4 and the copy of the web page output shown in FIG. 4 recorded in step 3. As shown, the comparison module may, by comparing the generated different web page outputs shown in FIG. 5 and the recorded web page output copy shown in FIG. 4, determine that in the rendered different web page outputs shown in FIG. 5, the web page output corresponding to the key variable role equal to role1 is consistent with the copy of the web page output recorded in FIG. 4, thus the mapping relationship between the step step1 of the test case testcase1 corresponding to the recorded web page output copy in FIG. 4 as well as the button element btn1 it manipulates and the key variable role and its value role1 may be determined: testcase1:step1:element(btn1)→JSP1: role=="role1", and the mapping relationship may be recorded in the condition mapping database.

After the above steps 4 and 5 have been performed, correspondingly in the above step 2', the rendering engine module may, for each step of each test case in the element mapping relationship recorded in the above step 3, obtain the identifier of the web page output corresponding to the step, and obtain the modified web page with the same identifier, and then obtain the key variable and its value corresponding to the step based on the key variables/branches mapping relationship recorded in the above step 5, and use the key variable and its value to render the modified web page with the same identifier, so as to generate a modified web page output.

Then, at the above step 3', the detecting module in the system of the present invention may detect the modified web page output generated using the key variable and its value at the above step 2', to determine whether the modified web page output still contains the recorded element corresponding to the step in the element mapping relationship. If the result of the determination is no, the detecting module may determine that the step is a broken point and report this to the user, so that the user can fix it.

Figure 7:
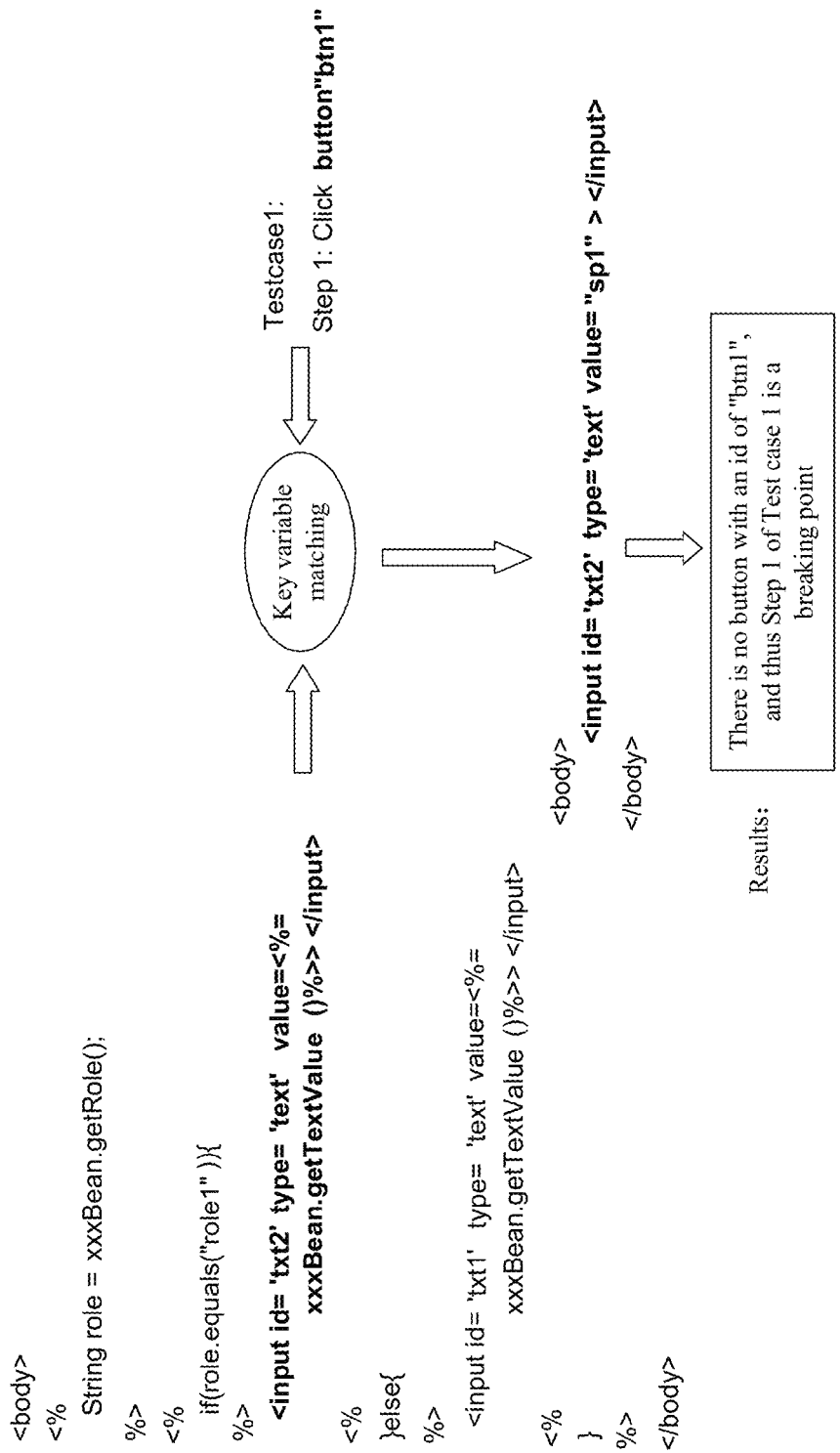
FIG. 7 shows a process of rendering a corresponding modified web page by a rendering engine module and of determining a broken point by a detecting module in accordance with an embodiment.

FIG. 7 shows the process of rendering the corresponding modified web page by the rendering engine module and of determining the broken point by the detecting module in the system. As shown, the rendering engine module may, based on the recorded key variables/branches mapping relationship shown in FIG. 6, with respect to the step step1 in the test case testcase1 in the key variables/branches mapping relationship, obtain the identifier JSP1 of the web page output corresponding to the step step1 of the test case testcase1 from the element mapping relationship database generated in the above step 3 (or obtain the identifier directly from the key variables/branches mapping relationship, if it exists there), so as to obtain the modified web page with the same identifier (as shown at the top-left in the Figure); next, based on the key variable and its value JSP1:role1="role1" in the key variables/branches mapping relationship, the key variable and its value are used to render the modified web page, so as to generate a modified web page output. As shown, the modified web page output will include a text input box with an id of txt2.

Then, the detecting module may obtain the type and identifier of the element in the web page output JSP1 manipulated by the step step1 in the test case testcase1 from the element mapping relationship database generated in the above step 3, i.e., button btn1 (or directly obtaining the type and identifier of the element from the above condition mapping relationship database, if it exists there), and determine whether the modified web page output still contains the element btn1 of the same type and identifier, and when the result of the determination is no, determine that there is a broken point, and then generate a report about the broken point and display it to the user. As shown, since the modified web page output only contains a text input box with an id of txt2, and no longer contains the button with an id of btn1, it may be determined that this step in the test case is a braking point, and the broken point may be reported to the user.

The detecting module may further report to the user comparison between the information of the element originally corresponding to the step in the test case (e.g., as recorded in the element mapping database) and related information of the element contained in the modified web page output, and may propose a proper fix suggestion to the user based on such comparison. In addition, the detecting module may further, based on the comparison result between the information of the element originally corresponding to the step in the test case and the related information of the element contained in the modified web page output, assign different broken levels for the broken point. For example, in the case that the id of the element has not changed and only the name or other attributes have changed, a broken level of "warning" may be assigned; and in other cases, a broken level of "error" may be assigned.

FIG. 8 shows an example of a report about broken points generated by the detecting module. As shown, the report includes three broken points determined by the detecting module. The first broken point is step 1 in test case 1, its test script code is clickAt("//input[@id='signInBtn'], " "), the information of the element it manipulates is tag="input" id="signInBtn" name="signInBtn" xpath="//form[@id='login_form']/p[1]/input[0]" key="id" (including the type, id, name, path attributes of the element and which attribute is the key for finding the element in the script), its broken level is error, and its fix suggestion is that the id of the element with the same name (in the modified web page output) is signBtn (no longer sign1 nbtn). The second broken point is step 2 in test cast 3, its test script code is clickAt("//button[@id='btnStart'], " "), the information of the element it manipulates is tag="button" id="btnStart" xpath="//div[@id="content"]/p[0]/Button" key="id" (including the type, id, name, path attributes of the element and which attribute is the key for finding the element in the script), its braking level is warning, and its fix suggestion is that the element (in the modified web page) is an input box "btnStart" (no longer button "btnStart"). The third broken point is step 4 in the test case 3, its test script code is cicikAt("link=Notices"), the information of the element it manipulates is tag="a" linkText="Notices" key="linkText" (including the type of the element, the link text attribute and which attribute is the key for finding the element in the script), its broken level is error, and its fix suggestion is null.

Generally, the number of the key variables in a JSP file (and other files for generating dynamic web contents) and the number of corresponding branches are small, and the typical number is 0, 1 or 2. Therefore, updates to a web application in most cases will not change the key variables themselves, especially when the web application has entered into a stable phase, while automatic testing is usually introduced at this phase. For such a web application update not changing the key variables themselves, the system may determine through the above process and provide to the user all the broken points.

However, in some cases, an update to the web application may change a key variable itself, including changing the name of the key variable, deleting the key variable and adding a new key variable.

For the case that the name of a key variable has been changed when updating the web application, an updating module in the system may, in response to that the name of the key variable in the updated web page has been changed, correspondingly update the name of the corresponding key variable in the condition mapping database. In this way, the rendering engine module in the system of the present invention may use the key variable with the changed name recorded in association with the step in the test case as well as its value or value range to render the web page output of the updated web page, and the detecting module in the system of the present invention may detect whether the rendered web page output still contains the element manipulated by the step.

For the case that the key variable has been deleted when updating the web application, the rendering engine module in the system may, in response to that the key variable recorded in association with the step in the test case has been deleted in the updated web page, no longer use the key variable recorded in association with the step and its value or value range to render the web page output of the updated web page, rather, it may use the remaining key variables recorded in association with the step as well as their values or value ranges (if any) or use no key variable and value or value range to render the web page output of the updated web page. In this way, the detecting module in the system may detect whether the rendered web page output contains the element manipulated by the step.

For the case that a new key variable has been added when updating the web application, the rendering engine module in the system may, in response to having added the new key variable in the updated web page, by assigning different values or value ranges to the new key variable (and using the key variable recorded in association with the step in the test case and value or value range thereof, if any), render all the possible web page outputs depending on the different values or value ranges of the new key variable in the updated web page. Then, the detecting module in the system may detect whether all the rendered possible web page outputs contain the element manipulated by the recorded step in the test case, and only when all the possible web page outputs contain the element manipulated by the recorded step in the test case, can it determine that the step is not a broken point, and when any of the web page outputs does not contain the element manipulated by the recorded step in the test case, it may determine the step as a broken point.

While above is described the overall operational process of the system for detecting a broken point in a web application automatic test case according to an embodiment of the present invention, in the following will be described the structural composition of the system for detecting a broken point in a web application test case automatic case according to an embodiment of the present invention by referring to FIG. 9. Some details repeating the above description will be omitted in the following description, thus more detailed understanding of the system may be obtained by referring to the above description.

Figure 9:
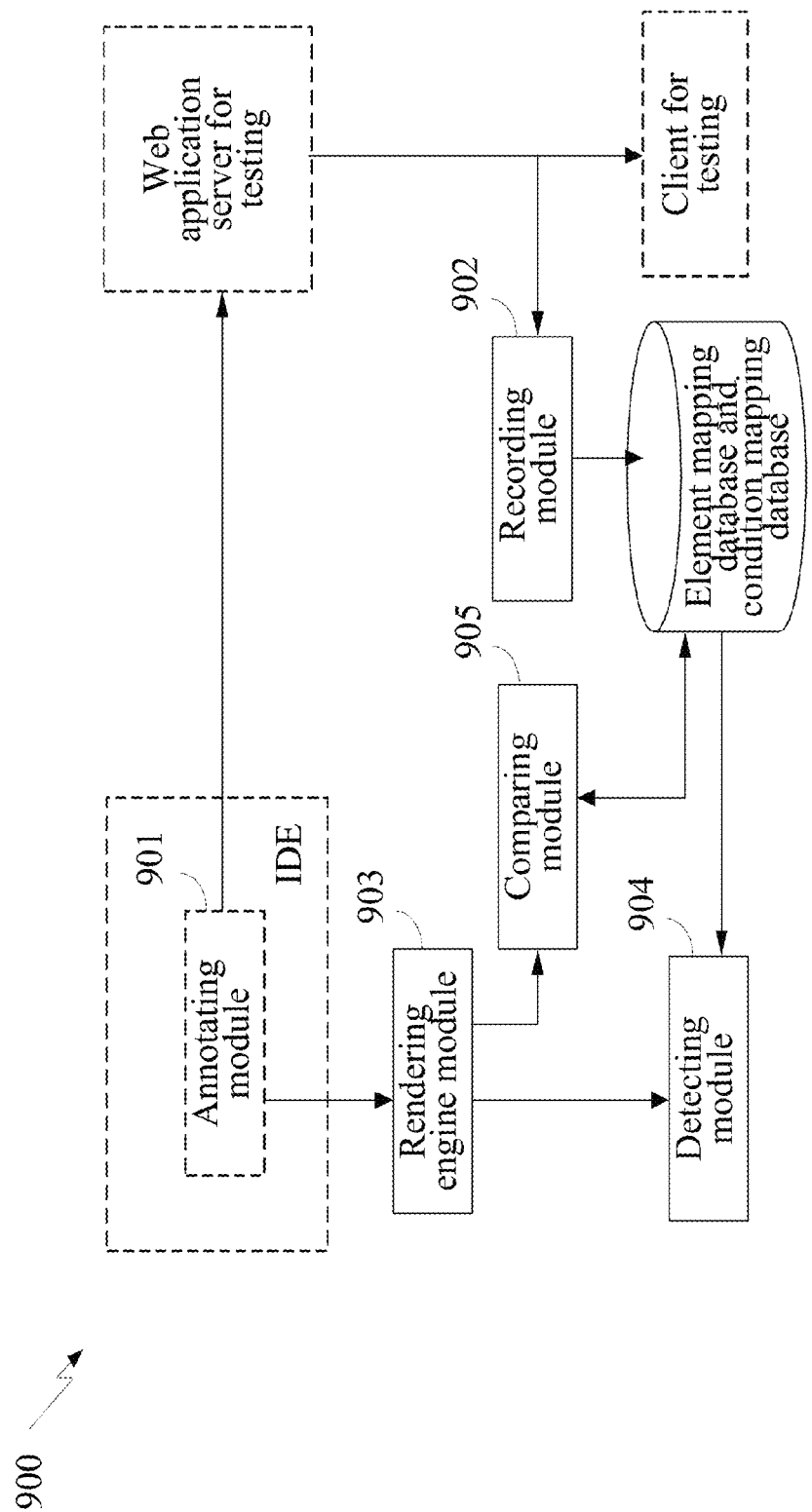
FIG. 9 shows the structural composition of a system for detecting a broken point in a web application automatic test case according to an embodiment.

As shown in FIG. 9, the system 900 for detecting a broken point in a web application automatic test case includes a recording module 902 configured to, when the automatic test case runs, for at least one step in the automatic test case, record a web page output corresponding to the step, and information of the element manipulated by the step in the web page output, wherein the web page output has an annotation for identifying the web page output. In an embodiment, the recording module 902 is in a test environment.

The system 900 also includes a rendering engine module 903 configured to, after the web application has been updated, for the recorded at least one step of the test case, render a web page output of the updated web page with the same annotation as appearing in the web page output corresponding to the step.

The system 900 further includes a detecting module 904 configured to detect whether the rendered web page output of the updated web page contains an element manipulated by the recorded step, and to determine the step as the broken point when the detecting result is no. In an embodiment, the detecting module 904 is in the test environment.

In an embodiment, the rendering engine module 903 is outside the web application server running the web application, and it may obtain a web page from the web application server or directly from a development environment, and render it. In this way, it is not needed to modify the web application server per se.

According to an embodiment of the present invention, the detecting module 904 is further configured to report relevant information of the determined broken point to the user when the detecting result is no.

According to a further embodiment of the present invention, the detecting module 904 is further configured to: when the detecting result is no, report comparison results between information of the element manipulated by the recorded step and information of a related element contained in the web page output of the updated web page.

According to an embodiment of the present invention, system 900 further comprises an optional annotating module 901 configured to add an annotation for identifying a web page under development to the web page in a development environment. The annotating module 901 may be in the IDE, as a plug-in module in the IDE.

According to an embodiment of the present invention, for the recorded web page output with the annotation, the rendering engine module 903 is further configured to determine whether the original web page with the same annotation contains a conditional statement, and in response to the determination of yes, render all the possible web page outputs of the original web page with the same annotation by assigning different values or value ranges to a key variable in the conditional statement;

The system 900 may also include an optional comparison module 905 configured to compare the recorded web page output with each one of all the rendered possible web page outputs, to find a web page output consistent with the recorded web page output in all the rendered possible web page outputs, and to record the key variable and its value or value range corresponding to the rendered consistent web page output in association with the step in the test case corresponding to the recorded web page output.

According to a further embodiment of the present invention, the rendering engine module 903 is further configured to, after the web application has been updated, for the recorded at least one step of the test case, use the key variable and its value or value range recorded in association with the step to render the web page output of the updated web page with the same annotation as appearing in the web page output corresponding to step.

According to an embodiment of the present invention, the rendering engine module 903 is further configured to analyze the source code of the original web page with the same annotation to obtain a loop statement contained therein, and add special marks on the information items generated by the loop statement in all the rendered possible web page outputs.

According to a further embodiment of the present invention, the comparing module 905 is further configured to, during the comparing process, ignore information items with the special marks in each one of all the rendered possible web page outputs and corresponding information items in the recorded web page output.

According to an embodiment of the present invention, the key variable and its value or value range corresponding to the rendered consistent web page output are recorded in association with the step in the test case corresponding to the recorded web page output in a condition mapping database.

The system 900 further comprises an updating module (not shown) configured to, after the web application has been updated, in response to that the name of a key variable in the updated web page has been changed, correspondingly change the name of the corresponding key variable in the condition mapping database.

According to an embodiment of the present invention, the rendering engine module 903 is further configured to, after the web application has been updated, for the recorded at least one step of the test case, in response to that the key variable recorded in association with the step has been deleted from the updated web page with the same annotation as appearing in the web page output corresponding to the step, render the web page output of the updated web page without using the key variable recorded in association with the step and its value or value range.

According to an embodiment of the present invention, the rendering engine module 903 is further configured to, after the web application has been updated, for the recorded at least one step of the test case, in response to having added a new key variable to the updated web page with the same annotation as appearing in the web page output corresponding to the step, render all the possible web page outputs of the updated web page by assigning different values to the new key variable. The detecting module 904 is further configured to: detect whether each web page output in all the rendered possible web page outputs of the updated web page contains an element manipulated by the recorded step, and determine the step as a broken point when the detection result for any one of all the possible web page outputs is no.

According to an embodiment of the present invention, the key value and its value or value range corresponding to the rendered consistent web page output are recorded in association with the step in the test case corresponding to the recorded web page output in the condition mapping database. The system 900 further includes a coverage determining module (not shown), configured to determine the coverage of test cases by querying the condition mapping database.

According to an embodiment of the present invention, the comparison of the recorded web page output and any one of all the rendered possible web page outputs include generating a DOM tree of the recorded web page output and a DOM tree of each of the rendered web page outputs, and then comparing the DOM trees.

Above is described the structural composition of a system for detecting a broken point in a web application automatic test case according to an embodiment of the present invention. It should be pointed out that the above description is only exemplary, rather than limitation to the present invention. In other embodiments of the present invention, the system may have more, less or different modules, and the relationships of connection, inclusion, function, etc. among the modules may be different from described.

Figure 10:
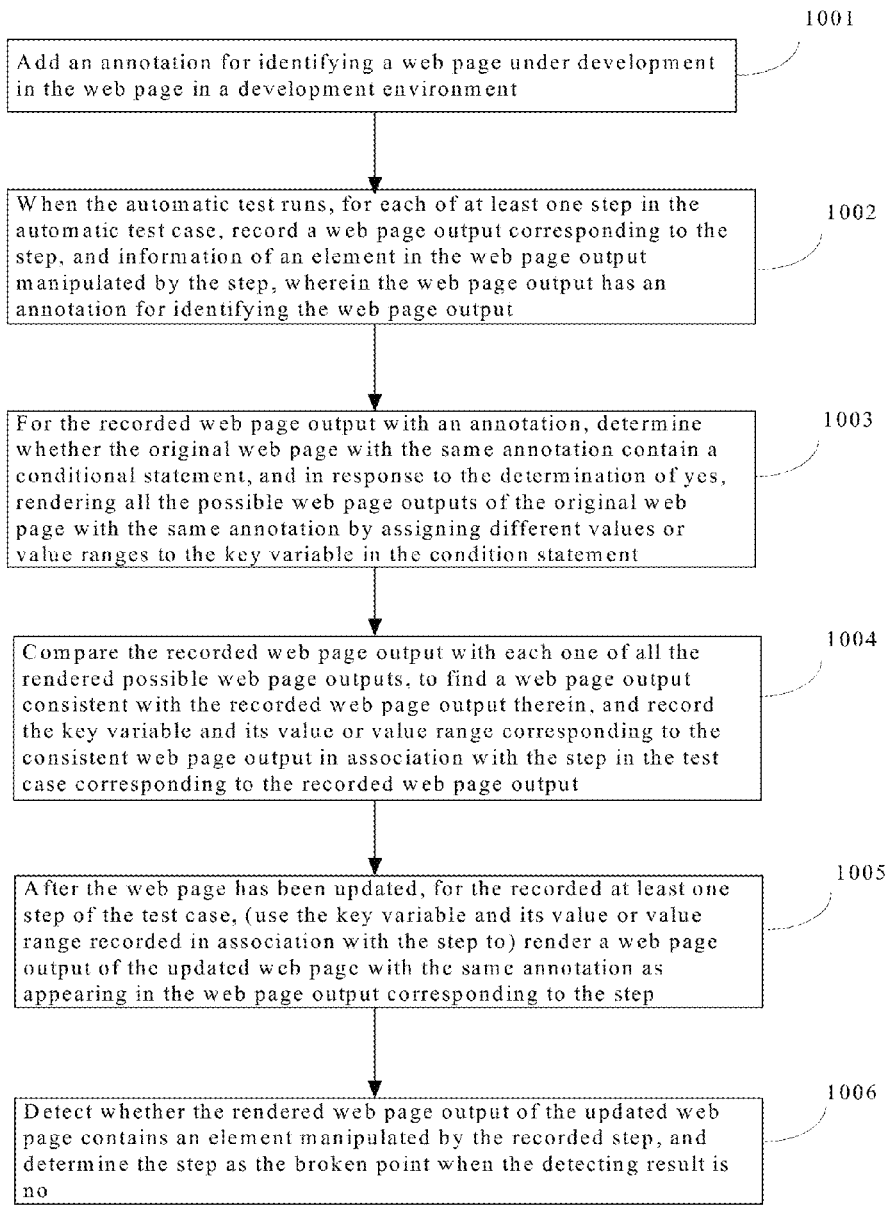
FIG. 10 shows a method for detecting a broken point in a web application automatic test case according to an embodiment.

In the following is described a method for detecting a broken point in a web application automatic test case according to an embodiment of the present invention with reference to FIG. 10.

In step 1002, when the automatic test case runs, for at least one step in the automatic test case, the method includes recording a web page output corresponding to the step, and information of an element manipulated by the step in the web page output. The web page output has an annotation for identifying the web page output.

In step 1005, after the web application has been updated, for the recorded at least one step of the test case, the method includes rendering a web page output of the updated web page with the same annotation as appearing in the web page output corresponding to the step.

In step 1006, the method includes detecting whether the rendered web page output of the updated web page contains the element manipulated by the recorded step, and determining the step as a broken point when the detecting result is no.

According to an embodiment of the present invention, the step 1006 further includes reporting relevant information of the determined broken point to the user when the detecting result is no.

According to a further embodiment of the present invention, the method further includes, when the detecting result is no, reporting comparison results between information of the element manipulated by the step and information of a related element contained in the web page output of the updated web page to the user.

According to an embodiment of the present invention, the method further includes an optional step 1001 of adding an annotation for identifying a web page under development to the web page in a development environment.

According to an embodiment of the present invention, the method further comprises optional steps, as will now be described.

In step 1003, for the recorded web page output with the annotation, the method includes determining whether the original web page with the same annotation contains a conditional statement, and in response to the determination of yes, rendering all the possible web page outputs of the original web pages with the same annotation by assigning different values or value ranges to a key variable in the conditional statement.

In step 1004, the method includes comparing the recorded web page output with each of all the rendered possible web page outputs, to find a web page output consistent with the recorded web page output in all the possible rendered web page outputs, and recording the key variable and its value or value range corresponding to the rendered consistent web page output in association with the step in the test case corresponding to the recorded web page output.

According to a further embodiment of the present invention, the step 1005 of, after the web application has been updated, for the recorded at least one step in the test case, rendering a web page output of the updated web page with the same annotation as appearing in the web page output corresponding to the step further includes, after the web application has been updated, for the recorded at least one step of the test case, the method includes using the key variable and its value or value range recorded in association with the step to render the web page output of the updated web page with the same annotation as appearing in the web page output corresponding to the step.

According to an embodiment of the present invention, the step of rendering all the possible web page outputs of the original web page with the same annotation further includes analyzing the source code of the original web page with the same annotation to obtain a loop statement contained therein, and adding special marks to the information items generated by the loop statement in all the possible web page outputs.

The comparing the recorded web page output with each one of all the rendered possible web page outputs further includes, during the comparison process, ignoring information items with the special marks in each one of all the rendered possible web page outputs and corresponding information items of the recorded web page output.

According to an embodiment of the present invention, the key variable and its value or value range corresponding to the rendered consistent web page output are recorded in association with the step of the test case corresponding to the recorded web page output in the condition mapping database. The method further includes, after the web application has been updated, in response to the name of a key variable in the updated web page has been changed, correspondingly updating the name of the corresponding key variable in the condition mapping database.

According to an embodiment of the present invention, after the web application has been updated, for the recorded at least one step of the test case, using the key variable recorded in association with the step and its value or value range to render a web page output of the updated web page with the same annotation as appearing in the web page output corresponding to the step further includes, after the web application has been updated, for the recorded at least one step of the test case, in response to that the key variable recorded in association with the step has been deleted from the updated web page with the same annotation as appearing in the web page output corresponding to the step, rendering the web page output of the updated web page without using the key variable recorded in association with the step and its value or value range.

According to an embodiment of the present invention, after the web page has been updated, for the recorded at least one step of the test case, rendering a web page output of the updated web page with the same annotation as appearing in the web page output corresponding to the step further includes, after the web application has been updated, for the recorded at least one step of the test case, in response to having added a new key variable in the updated web page with the same annotation as appearing in the web page output corresponding to the step, rendering all the possible web page outputs of the updated web page by assigning different values to the new key variable.

The detecting whether the rendered web page output of the updated web page contains the element manipulated by the recorded step, and determining the step as the broken point when the detecting result is no, further includes detecting whether each web page output of all the rendered possible web page outputs of the updated web page contains the element manipulated by the recorded step. When the detection result for any one of all the possible web page outputs is no, the method includes determining the step as a broken point.

According to an embodiment of the present invention, the key variable and its value or value range corresponding to the rendered consistent web page output are recorded in the condition mapping database in association with the step in the test case corresponding to the recorded web page output. The method further includes determining the coverage of test cases by querying the condition mapping database.

The above description relates to testing a broken point in a web application automatic test case according to embodiments of the present invention. It should be pointed out that the above description is provided for illustrative purposes and is not to be construed as limiting in scope. For example, in other embodiments of the present invention, the method may have more, less or different steps, and the relationships of sequences, inclusion, function, etc., among the steps may be different from those described above.

Figure 11:
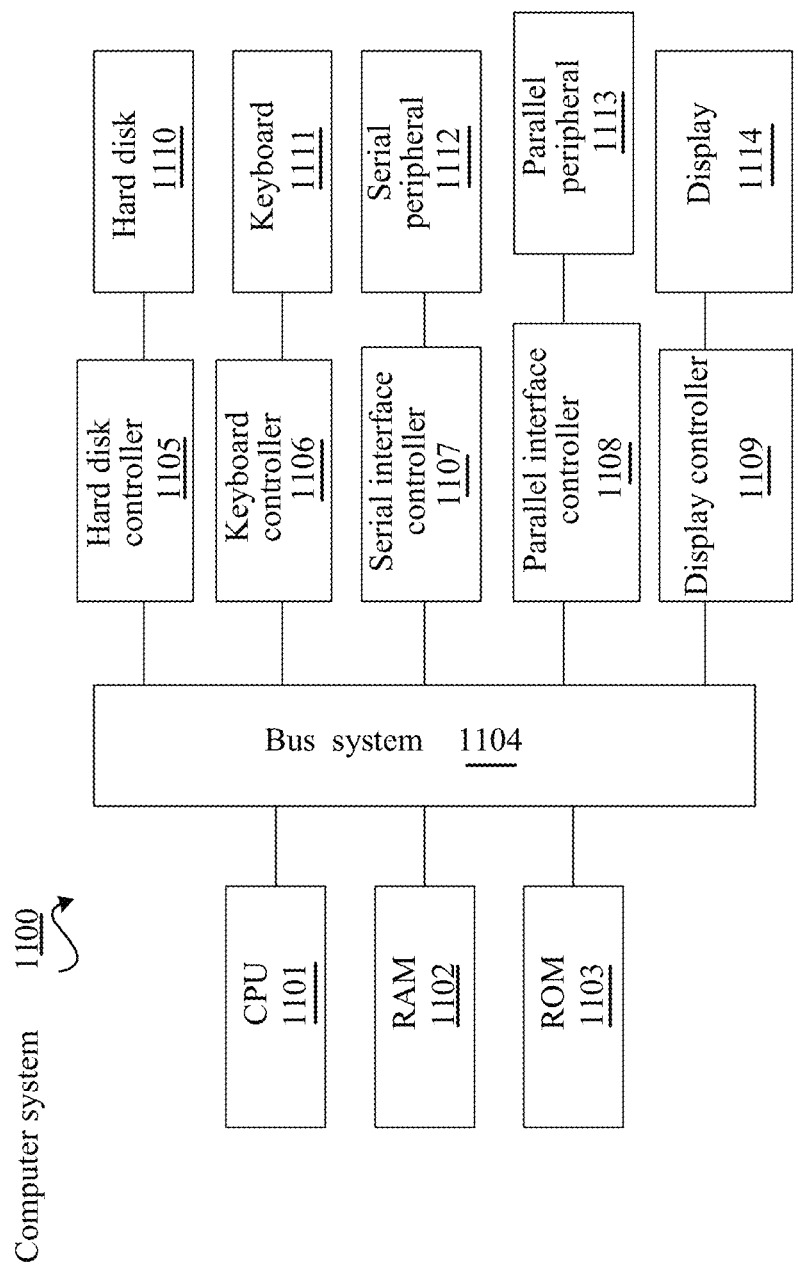
FIG. 11 shows a block diagram of an exemplary computing system in accordance with an embodiment.

FIG. 11 shows a block diagram of an exemplary computing system 1100 adapted to implement the embodiments of the present invention. As shown, computer system 110 includes a CPU (central processing unit) 1101, RAM (random access memory) 1102, ROM (read-only memory) 1103, system bus 1104, hard disk controller 1105, keyboard controller 1106, serial interface controller 1107, parallel interface controller 1108, display controller 1109, hard disc 1110, keyboard 1111, serial peripheral 1112, parallel peripheral 1113 and display 1114. Among these devices, what are coupled with the system bus 1104 are CPU 1101, RAM 1102, ROM 1103, hard disc controller 1105, keyboard controller 1106, serial controller 1107, parallel controller 1108 and display controller 1109. The hard disc 1110 is coupled with the hard disc controller 1105; the keyboard 1111 is coupled with the keyboard controller 1106; the serial peripheral 1112 is coupled with the serial interface controller 1107; the parallel peripheral 1113 is coupled with the parallel interface controller 1108, and display 1114 is coupled with display controller 1109. It should be appreciated that the structural block diagram of FIG. 11 is merely shown for example, is not to be construed as limiting in scope. In other embodiments, some devices may be added or reduced depending on specific conditions.

As can be seen from the above, and compared with existing solutions, the embodiments described herein offer advantages in that they directly provide testers with complete indications as to which contents in the test scripts need to be updated after UI code is changed so that the testers do not need to repeatedly run the test cases in order to find out broken points. In addition, the embodiments further assist in detecting the coverage of the test cases to a certain extent. For example, if a web page has three different exit points leading to three different paths, then the embodiments described herein may help detect whether the automatic test scripts cover all three paths.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for detecting a broken point in a web application automatic test case, comprising:
at least one computer processing device, the at least one computer processing device configured with a recording module, a rendering engine module, and a detecting module, wherein:
the recording module is configured to, when the automatic test case runs, for a step in the automatic test case, record a web page output for a web page corresponding to the step, and information of an element manipulated by the step in the web page output, the web page output including an annotation for identifying the web page output;
the rendering engine module is configured to, after the web application has been updated, for the recorded web page output corresponding to the step of the automatic test case, render a web page output of an updated web page with the same annotation as appearing in the web page output corresponding to the step;
the detecting module is configured to detect whether rendered web page output of the updated web page contains the element manipulated by the step, and determine the step as a broken point when a result of the detecting indicates the rendered web page output does not contain the element;
for the recorded web page output with the annotation, the rendering engine module is further configured to determine whether the web page with the annotation contains a conditional statement, and in response to determining the webpage with the annotation contains the conditional statement, render all possible web page outputs of the web page with the annotation by assigning different values or value ranges to a key variable in the conditional statement;
wherein the at least one computer processing device further comprises a comparing module configured to compare the recorded web page output with each of the rendered possible web page outputs, to find a web page output consistent with the recorded web page output in the rendered possible web page outputs, and to record the key variable and its value or value range corresponding to the rendered consistent web page output in association with the step in the automatic test case corresponding to the recorded web page output.

2. The system of claim 1, wherein the detecting module is further configured to report information of the determined broken point to a user when the result of the detecting indicates the rendered web page output does not contain the element.

3. The system of claim 1, further comprising:
an annotating module configured to add an annotation in a development environment for identifying a web page under development to the web page.

4. The system of claim 1, wherein, the rendering engine module is further configured to:
after the web application has been updated, for the recorded step of the automatic test case, use the key variable and its value or value range recorded in association with the step to render the web page output of the updated web page with the same annotation as appearing in the web page output corresponding to the step.

5. The system of claim 1, wherein, the rendering engine module is further configured to:
analyze source code of the web page with the annotation to obtain a loop statement contained therein; and
add marks to information items generated by the loop statement in the rendered possible web page outputs.

6. The system of claim 5, wherein the comparing module is further configured to:

ignore information items with the marks in each one of the rendered possible web page outputs and corresponding information items in the recorded web page output.

7. The system of claim 1, wherein the rendering engine module is further configured to:
after the web application has been updated, for the recorded step of the automatic test case, in response to determining that the key variable recorded in association with the step has been deleted from the updated web page with the same annotation as appearing in the web page output corresponding to the step, render the web page output of the updated web page without using the key variable recorded in association with the step and its value or value range.

8. The system of claim 1, wherein, the rendering engine module is further configured to:
after the web application has been updated, for the recorded step of the automatic test case, in response to having added a new key variable in the updated web page with the same annotation as appearing in the web page output corresponding to the step, render the possible web page outputs of the updated web page by assigning different values to the new key variable;
and the detecting module is further configured to:
detecting whether each web page output of all the rendered possible web page outputs of the updated web pages contains the element manipulated by the recorded step, and determining the step as a broken point when the detecting result for any one of the possible web page outputs indicates no web page output contains the element.

9. The system of claim 1, wherein the key variable and its value or value range corresponding to the rendered consistent web page output are recorded in a condition mapping database in association with the step in the automatic test case corresponding to the recorded web page output;
wherein the system further comprises a coverage determining module configured to determine coverage of test cases by querying the condition mapping database.

10. The system of claim 1, wherein the key variable comprises a variable contained in a condition of the conditional statement.

11. A method for detecting a broken point in a web application automatic test case, comprising:
when the web application automatic test case runs, for a step in the automatic test case, recording a web page output for a web page corresponding to the step, and information of an element manipulated by the step in the web page output, the web page output including an annotation for identifying the web page output;
after the web application has been updated, for the recorded web page output corresponding to the step of the automatic test case, rendering a web page output of an updated web page with the same annotation as appearing in the web page output corresponding to the step;
detecting whether rendered web page output of the updated web page contains the element manipulated by the step, and determining the step as a broken point when a result of the detecting indicates the rendered web page output does not contain the element;
for the recorded web page output with the annotation, determining whether the web page with the annotation contains a conditional statement, and in response to determining the webpage with the annotation contains the conditional statement, rendering all possible web page outputs of the web page with the annotation by assigning different values or value ranges to a key variable in the conditional statement; and
comparing the recorded web page output with each one of the rendered possible web page outputs, to find a web page output consistent with the recorded web page output in the rendered possible web page outputs, and recording the key variable and its value or value range corresponding to the rendered consistent web page output in association with the step in the automatic test case corresponding to the recorded web page output.

12. The method of claim 11, further comprising:
reporting information of the determined broken point to a user when the result of the detecting indicates the rendered web page output does not contain the element.

13. The method of claim 11, further comprising:
adding an annotation for identifying a web page under development to the web page in a development environment.

14. The method of claim 11, wherein, after the web application has been updated, for the recorded step of the automatic test case, rendering the web page output of the updated web page with the same annotation as appearing in the web page output corresponding to the step further comprises:
after the web page has been updated, for the recorded step of the automatic test case, using the key variable and its value or value range recorded in association with the step to render the web page output of the updated web page with the same annotation as appearing in the web page output corresponding to the step.

15. The method of claim 11, wherein, the rendering the possible web page outputs of the web page with the annotation further comprises:
analyzing source code of the web page with the annotation to obtain a loop statement contained therein; and
adding marks to information items generated by the loop statement in the rendered possible web page outputs.

16. The method of claim 15, wherein the comparing the recorded web page output and each one of the rendered possible web page outputs further comprises:
ignoring information items with the marks in each one of the rendered possible web page outputs and corresponding information items in the recorded web page output.

17. The method of claim 11, wherein after the web application has been updated, for the recorded step of the automatic test case, using the key variable recorded in association with the step and its value or value range to render a web page output of the updated web page with the same annotation as appearing in the web page output corresponding to the step further comprises:
after the web application has been updated, for the recorded step of the automatic test case, in response to determining that the key variable recorded in association with the step has been deleted from the updated web page with the same annotation as appearing in the web page output corresponding to the step, rendering the web page output of the updated web page without using the key variable recorded in association with the step and its value or value range.

18. The method of claim 11, wherein, after the web application has been updated, for the recorded step of the automatic test case, rendering a web page output of the updated web page with the same annotation as appearing in the web page output corresponding to the step further comprises:
after the web application has been updated, for the recorded step of the automatic test case, in response to having added a new key variable in the updated web page with the same annotation as appearing in the web page output corresponding to the step, rendering the possible web page outputs of the updated web page by assigning different values to the new key variable;

and the detecting whether the rendered web page output of the updated web pages contains the element manipulated by the recorded step, and determining the step as a broken point when the result of the detecting indicates the web page output does not contain the element further comprises:

detecting whether each web page output of the rendered possible web page outputs of the updated web pages contains the element manipulated by the recorded step, and determining the step as a broken point when the detecting result for any one of the possible web page outputs indicates no web page output contains the element.

19. The method of claim 11, wherein the key variable and its value or value range corresponding to the rendered consistent web page output are recorded in a condition mapping database in association with the step in the automatic test case corresponding to the recorded web page output;

wherein the method further comprises determining coverage of test cases by querying the condition mapping database.

* * * * *